United States Patent [19]

Kiya

[11] Patent Number: 4,718,841
[45] Date of Patent: Jan. 12, 1988

[54] ROTATION CONTROL SYSTEM FOR SCREW OF INJECTION MOLDING MACHINE

[75] Inventor: Nobuyuki Kiya, Hachioji, Japan

[73] Assignee: Fanuc Ltd., Minamitsuru, Japan

[21] Appl. No.: 863,890

[22] PCT Filed: Sep. 4, 1985

[86] PCT No.: PCT/JP85/00495
§ 371 Date: Apr. 29, 1986
§ 102(e) Date: Apr. 29, 1986

[87] PCT Pub. No.: WO86/01454
PCT Pub. Date: Mar. 13, 1986

[30] Foreign Application Priority Data
Sep. 4, 1984 [JP] Japan .................. 59-185048

[51] Int. Cl.⁴ .............................. B29C 45/80
[52] U.S. Cl. .................... 425/149; 264/40.5; 264/40.7; 425/170; 425/171
[58] Field of Search ........... 425/145, 147, 149, 170, 425/171, 169, 143; 264/40.7, 40.5, 328.8

[56] References Cited

U.S. PATENT DOCUMENTS 3,666,141 5/1972 Ma et al. .................. 425/145
3,767,339 10/1973 Hunkar .................... 425/149

FOREIGN PATENT DOCUMENTS 16816 6/1978 Japan .
179631 10/1983 Japan .
2119307 11/1983 United Kingdom .

Primary Examiner—Jay H. Woo
Assistant Examiner—Timothy W. Heitbrink
Attorney, Agent, or Firm—Staas & Halsey

[57] ABSTRACT

A rotation control system for a screw of an injection molding machine is so arranged that an injection shaft 2" and a screw (2) are driven by electric motors (20) and (22). An output signal from an injection shaft position sensor (21), which provides information indicative of rotation of the electric motor (22) driving the injection shaft 2", is applied to an error register (35-1). The position of the injection shaft is sensed by monitoring the error register (35-1), and the rotational speed of the screw (2) corresponding to the position of the injection shaft 2" is obtained by utilizing an override function.

11 Claims, 4 Drawing Figures

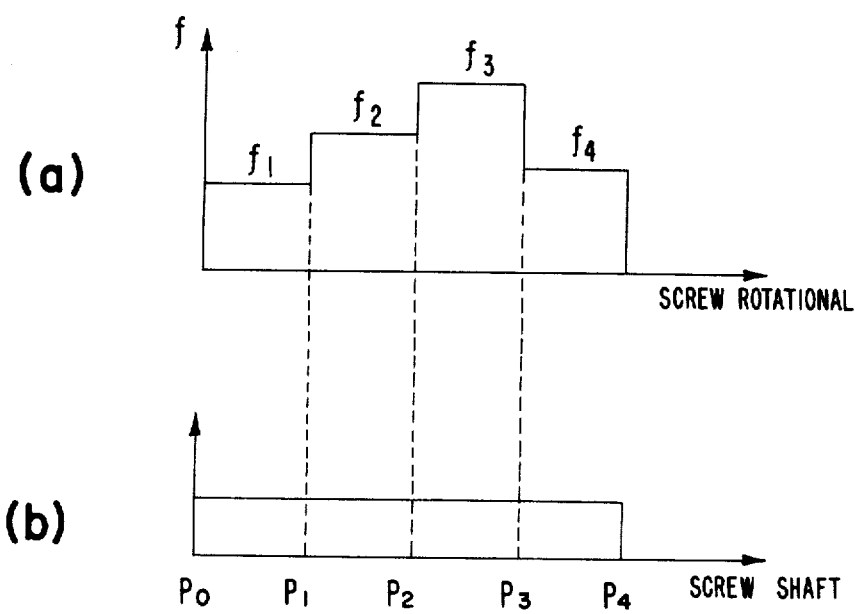

ROTATION CONTROL SYSTEM FOR SCREW OF INJECTION MOLDING MACHINE

BACKGROUND OF THE INVENTION

This invention relates to a system for controlling the rotation of a screw which feeds a molten material under pressure in an injection molding machine. More particularly, the invention relates to a rotation control system for the screw of an injection molding machine adapted to enable smooth and accurate control by using a numerical control unit (NC unit).

In the working of plastics, particularly most thermoplastic elastomers such as vinyl chloride resin, it is strongly desired that productivity be improved by reducing the energy needed for such working and that a uniform product quality be obtained. Accordingly, in recent years such devices as injection molding machines having a control unit incorporating a computer for accurate machining control have been put into practical use. FIG. 4 is a view showing the control system arrangement of an injection molding machine employed in the prior art. This conventional injection molding machine control system will now be described with reference to FIG. 4. In FIG. 4, numeral 1 denotes a hopper for holding chips of a thermoplastic elastomer such as vinyl chloride, and numeral 2 designates a screw for feeding the chips contained in the hopper 1 in the direction of a cylinder 2'. Due to rotation of the screw 2, the chips are fed to the cylinder 2' and are melted by the application of heat. The molten material, which is supplied to and fills the cylinder 2' and a nozzle 3, is injected into a mold 4 by movement of the screw 2 in the direction of the nozzle 3. Numeral 5 denotes a hydraulic motor for rotatively driving the screw 2, 6 a flowrate control valve for regulating the amount of oil supplied to the hydraulic motor 5, 7 a hydraulic cylinder for controlling back-and-forth movement of an injection shaft 2" (a shaft for moving the screw back and forth) inside the cylinder 2', and 8 a servo valve for controlling hydraulic pressure fed to the hydraulic cylinder 7. Numeral 9 denotes a tachogenerator for sensing the rotational speed of the screw 2 and for applying a screw rotation signal to a process control unit 15, described below. Numeral 11 represents an absolute encoder for sensing the axial position of the screw 2 and for producing a screw position signal applied to the process control unit 15. Numeral 12 designates a pressure sensor for sensing hydraulic chamber pressure of the hydraulic cylinder 7 and for producing injection pressure and back pressure signals applied to the process control unit 15. Numeral 13 denotes a cavity pressure sensor for sensing the pressure in a cavity of the mold 4 and for producing a detection signal applied to the process control unit 15.

The process control unit 15 has an internal computer, executes processing on the basis of input signals from each of the above-mentioned sensors and from temperature sensors provided on the mold 4 and heating cylinder, and outputs a servo valve control signal, flowrate control signal and temperature control signal.

In the conventional injection molding machine control system constructed as set forth above, the servo valve 8 is operated on the basis of the flowrate control signal and servo valve control signal produced by the process control unit 15 after the mold 4 is clamped and set, and the screw 2 is moved in the direction of the nozzle 3 so that the molten material filling the interior of the cylinder 2' is injected into the mold 4 from the nozzle 3. When the molten material is thus injected, the process control unit 15 executes control for dwell over a predetermined period of time, subsequently executes cooling control, retracts the screw 2 by operating the hydraulic cylinder 7 and effects control for unclamping the mold. After the workpiece molded by the mold is extracted, the mold 4 is reclamped, the hydraulic motor 5 is driven to rotate the screw, and the chips in the hopper 1 are fed into the cylinder 2' and melted. Thereafter, the injection operation is performed as described above to mold workpieces one after another.

In the conventional injection molding machine control system, the screw 2 is operated by the hydraulic motor 5 and hydraulic cylinder 7, so that control is implemented hydraulically. However, a hydraulic control system has a slow control response and a complicated mechanism, and is troublesome in terms of maintenance.

A system has recently been proposed in which rotation and movement of the injection molding machine screw are performed by electric motors and primary control is implemented by a computer.

However, various problems are encountered in control when the screw and injection shaft of the injection molding machine are driven by electric motors.

For example, since the chips in the hopper 1 are fed into the cylinder 2', a reaction force for the pressured feed of the chips acts upon the screw 2 when the screw is rotated. Since the screw 2 is rotated by the electric motor and a torque limit is imposed upon the motor, the screw 2 is moved backward by the reaction force when this force exceeds the torque limit. As a result, the chips are not supplied to the cylinder 2' in an accurate amount. Suitable means for solving this problem does not exist in the prior art.

SUMMARY OF THE INVENTION

The present invention has been devised to solve the aforementioned problem and its object is to provide a rotation control system for the screw of an injection molding machine in which, when the chips are fed into the cylinder from the hopper, the amount of chips supplied can be accurately maintained.

Another object of the present invention is to provide a rotation control system for the screw of an injection molding machine in which, by utilizing an override function possessed by a numerical control unit, the amount of chips supplied can be corrected and accurately maintained.

According to the present invention, there is provided a rotation control system for a screw of an injection molding machine in which raw material chips in a hopper are fed into a cylinder by a screw rotated by an electric motor, and the raw material inside the cylinder is injected into a mold by movement of the screw. The system includes a first electric motor for rotatively driving an injection shaft having a screw, first control means for controlling the first electric motor, movement means for moving the injection shaft longitudinally inside the cylinder, means for sensing a longitudinal position of the injection shaft, memory means for storing an override value stipulating a rotational speed of the first electric motor corresponding to the position of the injection shaft when the first electric motor is being rotatively driven, and control means for sensing the position of the injection shaft when the first electric motor is being rotatively driven, for reading an override corresponding to a predetermined position out of the memory means, and for correcting the rotational speed of the first electric motor by the override value.

When chips are fed into the cylinder by rotation of the screw in the injection molding machine screw rotation control system of the present invention, the position of the injection shaft is sensed by monitoring performed by an error register which receives a signal from the position sensing means sensing the position of the injection shaft, and the obtained rotational speed of the screw corresponds to the position of the injection shaft. As a result, the feed of the chips can be executed accurately, the control system is simplified, costs are reduced and energy is saved. In addition, screw rotation control can be carried out smoothly and accurately.

BRIEF DESCRIPTION OF THE DRAWINGS

FIG. 2 is a graph for describing screw rotation control;

FIG. 3 is a chart for describing an override table; and

DESCRIPTION OF THE PREFERRED EMBODIMENT

Figure 1:
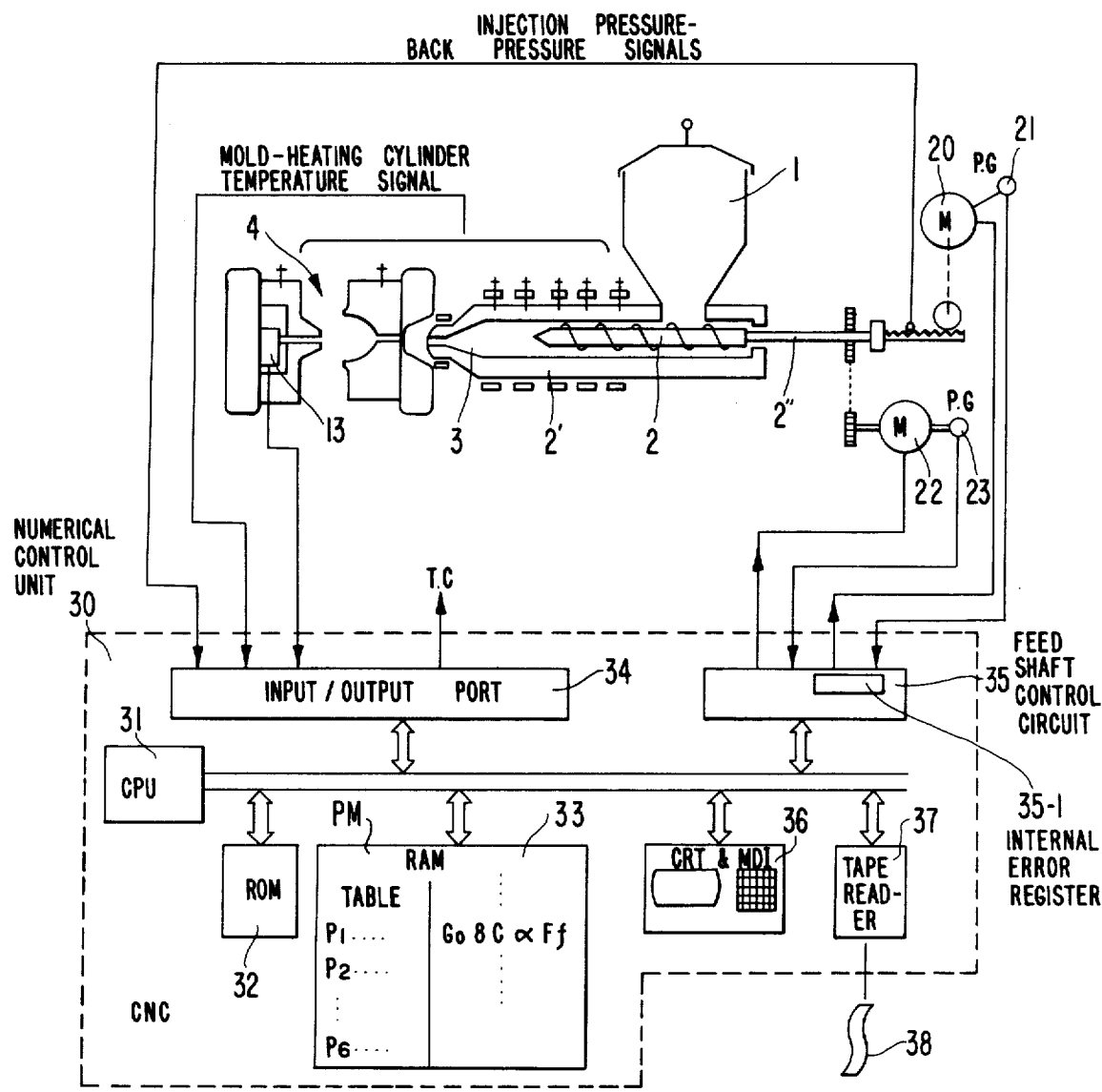
FIG. 1 is a diagram of the construction of an injection molding machine control system embodying the present invention.

The present invention will be described on the basis of an embodiment illustrated in the drawings.

Figure 4:
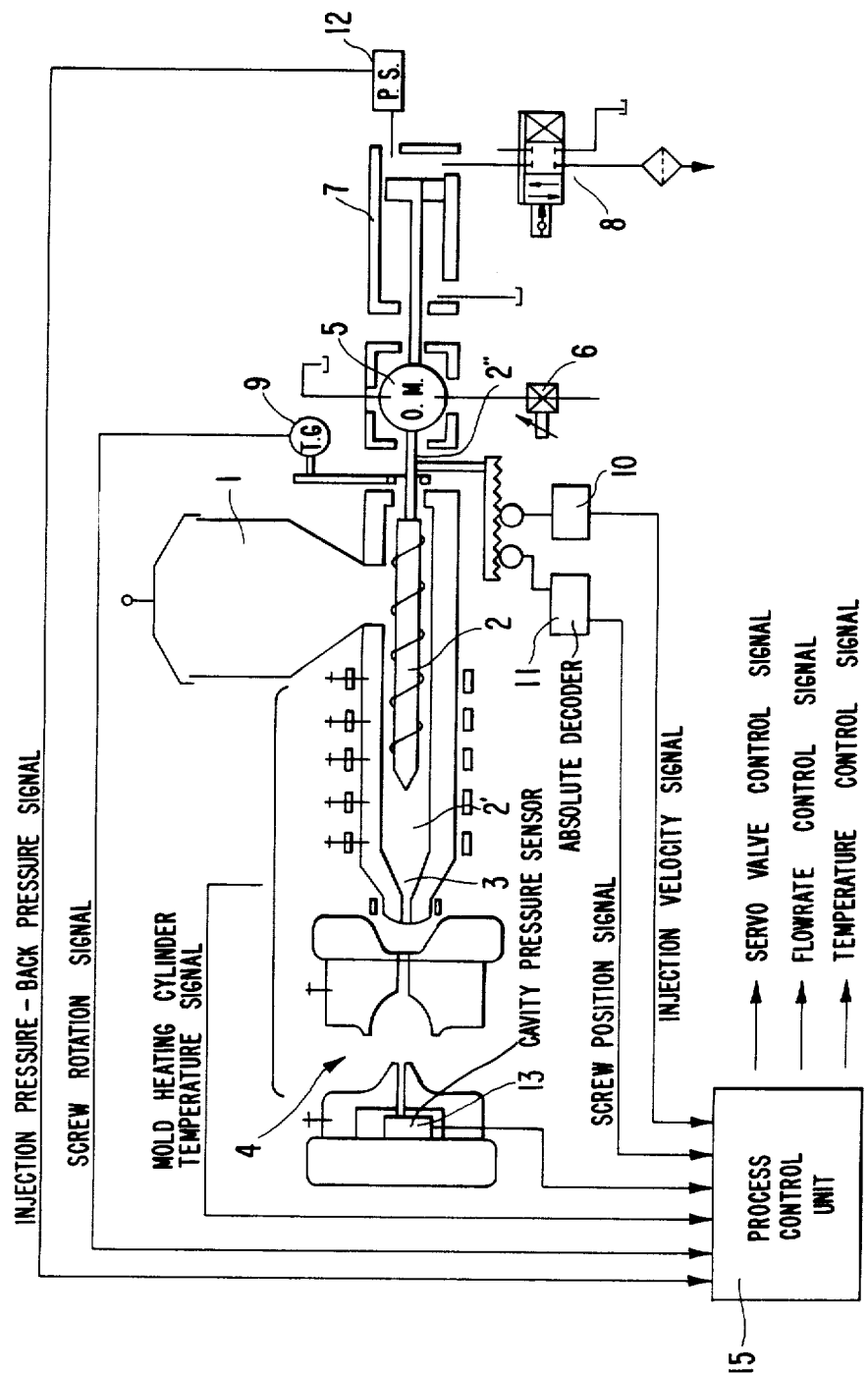
FIG. 4 is a diagram of the construction of a conventional injection molding machine control system.

FIG. 1 is a diagram of the construction of an injection molding machine control system embodying the present invention. Portions similar to those shown in FIG. 4 are designated by like reference characters and a detailed description thereof is deleted. In the Figure, numeral 20 denotes an electric motor for driving the injection shaft 2" (which is a shaft for moving the screw back and forth). Though not shown, the motor has a well-known torque limit function. Numeral 21 denotes a pulse generator for providing information indicative of rotation of the motor 20 and for producing a detection signal applied to a feed shaft control circuit 35, described below. Numeral 22 denotes an electric motor for screw rotation which, like the injection shaft motor 20, has a torque limit function. Numeral 23 designates a pulse generator for providing motor rotational position and velocity signals, which are applied to the feed shaft control circuit 35. Numeral 30 represents a numerical control unit (CNC unit) having an internal computer and including a processor (CPU) 31 for executing processing based on a control program, a read-only memory (ROM) 32 storing the control program, a random-access memory (RAM) 33 for storing the results of processing performed by the CPU 31 as well as various data, an input/output port 34, the feed shaft control circuit 35 having an internal error register 35-1, an operator's panel 36 having a display, and a tape reader 37. Further, numeral 38 denotes an NC tape bearing machining commands in punched form.

The operation of the injection molding machine control system of the illustrated embodiment arranged as set forth above will now be described.

The electric motor 20 for driving the injection shaft 2 in the longitudinal direction and the electric motor 22 for rotatively driving the screw 2 are controlled by the CNC unit 30. Specifically, the CNC unit 30 receives information indicative of rotation of the electric motor 20, which is sensed by the pulse generator 21, via the feed shaft control circuit 35, performs predetermined processing and subjects the electric motor to feedback control. Further, the CNC unit 30 receives information indicative of rotation of the electric motor 22, which is sensed by the pulse generator 23, via the feed shaft control circuit 35, compares the rotation information with a commanded value and executes control in such a manner that the electric motor 22 will rotate in a predetermined manner. The CNC unit 30 receives a variety of control information from various portions of the injection molding machine and executes predetermined processing to control temperature as well as injection and back pressure.

A specific example of an injection molding machine screw rotation control will now be described.

In order to correct the amount of chips supplied by back-up of the injection shaft 2 (the shaft for moving the screw back and forth) caused by a reaction force produced when the chips in the hopper 1 are fed into the cylinder 2', it is required that the rotational speed of the injection molding machine screw be changed in dependence upon the screw back-up position, as shown in FIGS. 2(a), (b). Specifically, in FIG. 2(b), P1, P2, P3, P4 indicate positions to which the retracting injection shaft 2" is moved. In FIG. 2(a), f1, f2, f3, f4 represent screw rotational speeds for effecting a correction.

In the present invention, the CNC unit 30 controls the rotational speed of the screw when the chips are fed into the cylinder 2'. Specifically, an NC command is provided with a G-code G08 for distribution and the following is commanded:

$$G08C\alpha Ff$$

In the above, C represents an address designating screw rotation, $\alpha$ indicates the rotational speed and designates a sufficiently large value, F is an address designating feedrate, and f represents a reference feedrate (rotational velocity).

Commands for the speed of the retracting injection shaft 2 at separate points along the operating axis are obtained by creating an override table in the RAM 33, storing the table in a parameter area PM of the RAM 33, and using the override table to obtain an override value corresponding to the rotational speed of the screw when the injection shaft 2", namely the screw 2, returns to each of the points P1 through P4 due to the reaction force of chip feed as the chips are fed by rotation of the screw 2.

FIG. 3 is a view for describing the override table, in which override values are arranged to correspond to the positions P1 through P4.

The G08 distribution is performed as follows:

(1) When the screw 2 is rotated to feed the chips into the cylinder 2' from the hopper 1, the distribution starts at a feedrate f and an override of f1/f×100.

(2) The CNC unit 30 monitors the contents of the error register 35-1 in the feed shaft control circuit 35 which receives a signal from the injection shaft 2", namely a detection signal from the pulse generator 21 sensing information indicative of rotation of the electric motor 20, which drives the injection shaft 2" back and forth. In this case the commanded position of the injection shaft 2" is Po. A force urging the injection shaft 2" in the opposite direction due to the chips being fed from the hopper 1 to the cylinder 2' by rotation of the screw 2 exceeds the torque limit of the electric motor 20, and the amount by which the injection shaft 2" is moved backward accumulates in the error register 35-1.

(3) When the value in the error register 35-1 becomes P1, the CNC unit 30 changes the override to f2/f×100.

(4) Similarly, the CNC unit 30 changes the override to f3/f×100 when the value in the error register 35-1 becomes P2, and to f4/f×100 when the value in the error register 35-1 becomes P3.

(5) When the value in error register 35-1 becomes P4, the CNC unit 30 renders a decision to the effect that the supply of chips is sufficient, terminates the distribution of screw rotation and ends the G08 distribution.

In an ordinary NC unit, an override is performed by an external signal, e.g. an external signal produced by an override switch. In the present invention, however, the arrangement is such that screw rotation override is effected internally of the NC unit in dependence upon mechanical positions along other axes of the NC unit.

More specifically, by monitoring its error register 35-1, the CNC unit 30 senses the position of the injection shaft 2, reads in the value from the error register 35-1 when it attains a predetermined value, and obtains a screw rotational speed corresponding to the mechanical position of the screw 2. This enables chips to be fed into the cylinder 2' in an accurate manner. In particular, rather than relying upon an injection molding machine screw rotation control system based on the conventional fluidic control, the present invention realizes a novel velocity control system incorporating an NC unit. The present invention has outstanding effects and will be of great use in future technological development.

Though the present invention has been described based on the illustrated embodiment, the invention is not limited to this embodiment but can be modified in various ways in accordance with the gist of the present invention, such modifications being within the scope of the invention.

The present invention is arranged to drive the injection shaft and screw of an injection molding machine by electric motors and to control the rotational speed of the screw in dependence upon the position of the injection shaft. Accordingly, it is possible to achieve primary control of the electric motors by a control unit, and the invention is particularly well-suited for application to control of screw rotation in an injection molding machine performed by a numerical control unit.

What is claimed is:

1. A rotation control system for a screw of an injection molding machine in which raw material chips in a hopper are fed into a cylinder by the screw which is rotated by an electric motor and the raw material inside the cylinder is injected into a mold by movement of the screw, said system comprising:
   a first electric motor for rotatively driving an injection shaft having a screw;
   first control means for controlling said first electric motor;
   movement means for moving the injection shaft longitudinally inside the cylinder;
   means for sensing the longitudinal position of the injection shaft;
   memory means for storing an override value stipulating a rotational speed of said first electric motor corresponding to the longitudinal position of the injection shaft when said first electric motor is being rotatively driven; and
   second control means for sensing the position of the injection shaft when said first electric motor is being rotatively driven, for reading an override value corresponding to a predetermined position out of said memory means, and for correcting the rotational speed of said first electric motor by the override value.

2. A rotation control system for a screw of an injection molding machine according to claim 1, wherein said means for sensing the longitudinal position of the injection shaft is an error register indicating a difference between a commanded value for moving the injection shaft in the longitudinal direction and a position of the injection shaft.

3. A rotation control system for a screw of an injection molding machine according to claim 1, wherein said movement means for moving the injection shaft is a second electric motor.

4. A rotation control system for a screw of an injection molding machine according to claim 3, wherein said first electric motor and said second electric motor are rotatively controlled by a numerical control unit including said first control means, said memory means and said second control means.

5. A rotation control system for a screw of an injection molding machine according to claim 1, wherein said means for sensing the longitudinal position of the injection shaft is a pulse generator.

6. A rotation control system for an injection molding machine having an injection shaft with a screw for feeding raw material for injection into a mold, comprising:
   an electric motor for rotatively driving the injection shaft having a screw;
   means for moving the injection shaft longitudinally in the injection molding machine;
   means for sensing the longitudinal position of the injection shaft and for providing an output; and
   a numerical control unit including:
      first control means for controlling said electric motor;
      memory means for storing override values for rotational speeds of said electric motor corresponding to the longitudinal position of the injection shaft when said electric motor is being rotatively driven; and
      second control means for reading in the output of said sensing means when said electric motor is being rotatively driven, for reading one of the override values corresponding to the sensed position from said memory means, and for correcting the rotational speed of said electric motor in accordance with the override value which is read.

7. A rotation control system according to claim 6, wherein said second control means comprises an error register for indicating the difference between a commanded value for moving the injection shaft in the longitudinal direction and the position of the detection shaft sensed by said sensing means.

8. A rotation control system according to claim 7, wherein said electric motor comprises a first electric motor and wherein said means for moving the injection shaft comprises a second electric motor.

9. A rotation control system according to claim 8, wherein said sensing means comprises a pulse generator coupled to said second electric motor.

10. A rotation control system according to claim 6, wherein said electric motor comprises a first electric motor and wherein said means for moving the injection shaft comprises a second electric motor.

11. A rotation control system according to claim 6, wherein said sensing means comprises a pulse generator coupled to said means for moving the injection shaft.

* * * * *

UNITED STATES PATENT AND TRADEMARK OFFICE
CERTIFICATE OF CORRECTION

PATENT NO. : 4,718,841

DATED : January 12, 1988

INVENTOR(S) : Nobuyuki KIYA

It is certified that error appears in the above-identified patent and that said Letters Patent is hereby corrected as shown below:

```
Column 3, line 64, change "shaft 2" to --shaft 2"--;
Column 4, line 18, change "shaft 2" to --shaft 2"--;
Column 4, line 42, change "shaft 2" to --shaft 2"--;
Column 4, line 68, after "2" (first occurrence) insert --,--.
Column 5, line 20, change "2" to --2"--.
```

Signed and Sealed this

Fourteenth Day of June, 1988

*Attest:*

DONALD J. QUIGG

*Attesting Officer*  *Commissioner of Patents and Trademarks*